(12) United States Patent
Fah

(10) Patent No.: US 7,628,745 B2
(45) Date of Patent: Dec. 8, 2009

(54) PRESSURE CYLINDER IN THE FORM OF A HOLLOW CYLINDER MADE OF METAL

(75) Inventor: Werner Fah, Au (CH)

(73) Assignee: Gallus Ferd. Ruesch AG, Gallen (CH)

( * ) Notice: Subject to any disclaimer, the term of this patent is extended or adjusted under 35 U.S.C. 154(b) by 622 days.

(21) Appl. No.: 10/499,614

(22) PCT Filed: Dec. 19, 2001

(86) PCT No.: PCT/CH01/00728

§ 371 (c)(1),
(2), (4) Date: Apr. 1, 2005

(87) PCT Pub. No.: WO03/051632

PCT Pub. Date: Jun. 26, 2003

(65) Prior Publication Data

US 2005/0166777 A1    Aug. 4, 2005

(51) Int. Cl.
*B05C 11/00* (2006.01)

(52) U.S. Cl. ............... 492/48; 492/57; 492/60; 101/375

(58) Field of Classification Search ............ 492/57, 492/58, 48, 40, 60; 101/375
See application file for complete search history.

(56) References Cited

U.S. PATENT DOCUMENTS

| | | | |
|---|---|---|---|
| 1,802,038 A | | 4/1931 | Springstead |
| 2,378,478 A * | | 6/1945 | Harless .................. 101/409 |
| 3,945,555 A * | | 3/1976 | Schmidt ................. 228/126 |
| 4,169,186 A * | | 9/1979 | Tazaki et al. ............ 428/406 |
| 4,453,848 A * | | 6/1984 | Adkisson et al. ......... 400/661 |
| 4,917,013 A | | 4/1990 | Katz |
| 5,451,198 A | | 9/1995 | Lancaster |
| 5,576,081 A * | 11/1996 | Sandt ..................... 428/36.9 |
| 5,773,796 A * | 6/1998 | Singer et al. ............. 219/470 |
| 6,006,806 A * | 12/1999 | Marschke ................ 156/472 |
| 6,065,402 A * | 5/2000 | Feller et al. ............. 101/350.5 |
| 6,105,651 A * | 8/2000 | Leanna .................... 156/555 |
| 6,154,626 A * | 11/2000 | Litman et al. ............ 399/282 |
| 6,236,830 B1* | 5/2001 | Hoberock et al. ......... 399/330 |
| 6,250,221 B1* | 6/2001 | Tice ....................... 101/246 |
| 6,708,407 B2* | 3/2004 | Leinonen et al. ......... 29/895.32 |
| 6,779,450 B1* | 8/2004 | Vieira et al. .............. 101/375 |
| 6,821,237 B1* | 11/2004 | Isometsa et al. ........... 492/46 |

(Continued)

FOREIGN PATENT DOCUMENTS

DE    212 175 C    8/1908

(Continued)

*Primary Examiner*—Essama Omgba
(74) *Attorney, Agent, or Firm*—Laurence A. Greenberg; Werner H. Stemer; Ralph E. Locher

(57) ABSTRACT

An impression cylinder in the form of a hollow cylinder made of metal, e.g., aluminum, for printing machines, having an essentially constant wall thickness over its length. The cylinder may have a predetermined inner diameter and may have various different outer diameters. The hollow cylinder includes a cylinder jacket. The cylinder jacket is provided with longitudinal openings, such as longitudinal bores. The employment of these longitudinal openings, e.g., bores, in various different numbers, sizes and shapes, enables impression cylinders having different external diameters and equal internal diameters to have substantially similar weights or mass per unit length.

8 Claims, 1 Drawing Sheet

| U.S. PATENT DOCUMENTS | | | | | FOREIGN PATENT DOCUMENTS | | |
|---|---|---|---|---|---|---|---|
| 6,854,171 | B2 * | 2/2005 | Ulf et al. ................. 29/401.1 | | DE | 196 13 145 A | 10/1997 |
| 6,971,174 | B2 * | 12/2005 | Liu et al. ................ 29/895.21 | | DE | 100 08 218 A | 8/2001 |
| 7,329,215 | B2 * | 2/2008 | Umeda ....................... 492/46 | | EP | 0 523 367 A | 1/1993 |
| 7,343,856 | B2 * | 3/2008 | Blohdorn .................. 101/467 | | | | |
| 2003/0029603 | A1 * | 2/2003 | Yamashita et al. ........... 165/89 | | | | |

* cited by examiner

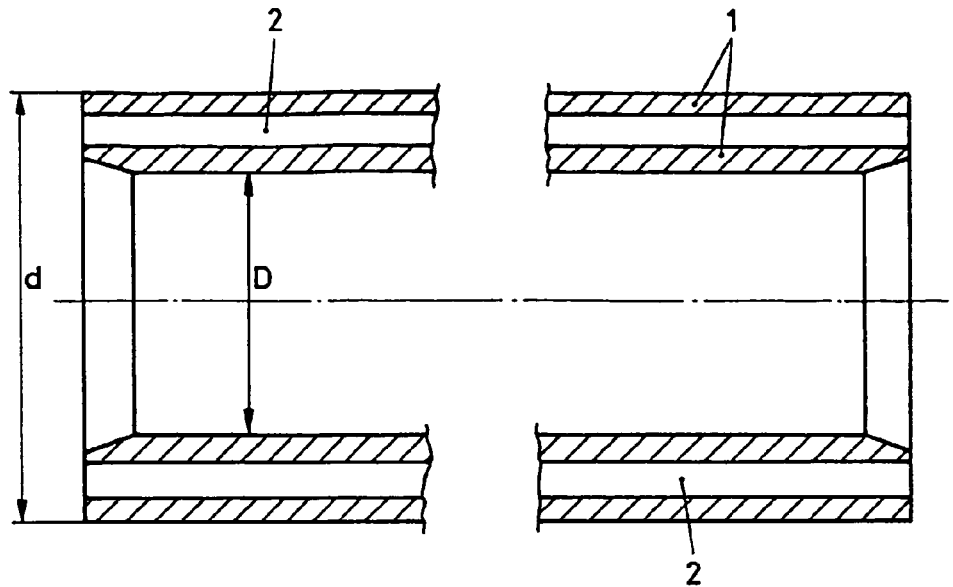
FIG.1
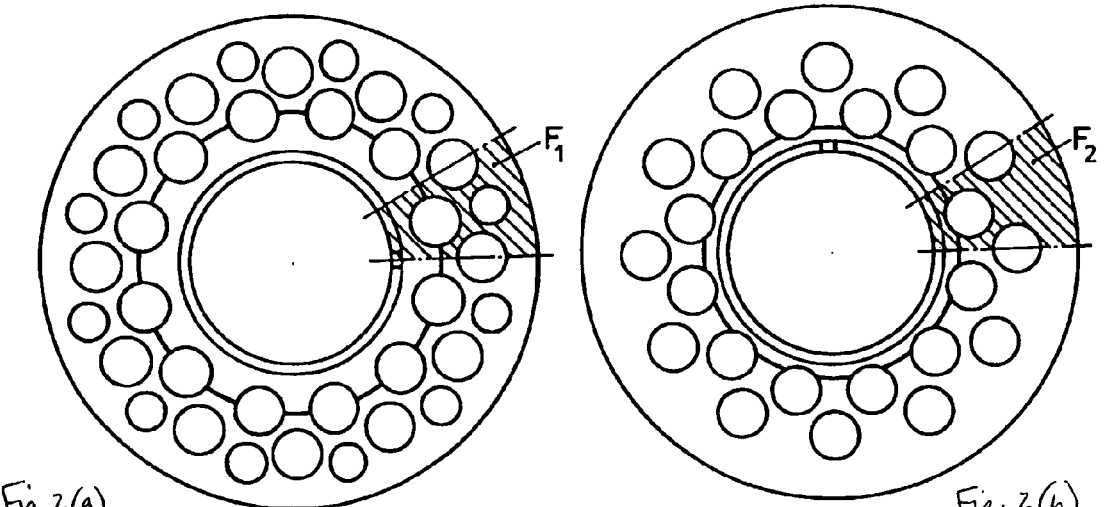
Fig. 2(a)
Fig. 2(b)
$F_1 \cong F_2 \cong F_3$
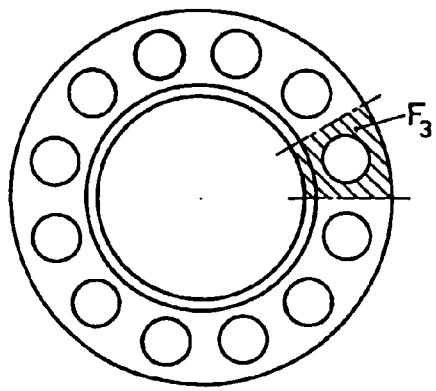
FIG.2(c)

PRESSURE CYLINDER IN THE FORM OF A HOLLOW CYLINDER MADE OF METAL

FIELD OF THE INVENTION

The present invention relates to an impression cylinder in the form of a hollow cylinder made of metal, particularly of aluminum, for printing machines, having an essentially constant wall thickness over its length.

BACKGROUND

Impression cylinders are known. In order to print different format lengths, different cylinder outer diameters are required, which, in turn, leads to different masses and weights of the cylinders. These differences cannot be adjusted by merely reducing the wall thicknesses of the hollow cylinders, without adversely effecting the rigidity of the cylinder. On the one hand, it is important to keep the weight of the impression cylinder as low as possible, to make handling the impression cylinder easier for the press operator. On the other hand, for the various different impression cylinder outer diameters that come into use, the differences in mass should be as low as possible, in order to keep the boundary conditions for the drive regulation as constant as possible.

It is an object of the present invention to create an impression cylinder construction which addresses the various conflicting requirements of such a device at a reasonable cost.

SUMMARY OF THE INVENTION

The present invention overcomes the above-stated disadvantages in a surprisingly simple manner. Specifically, the present invention provides an impression cylinder in the form of a hollow cylinder made of metal, particularly of aluminum, for printing machines, having an essentially constant wall thickness over its length.

The hollow cylinder includes a cylinder jacket. The cylinders may have different diameters. The cylinder jackets are provided with longitudinal openings, such as longitudinal bores. The employment of these longitudinal openings, e.g., bores, does not functionally impair the rigidity of the cylinders.

The present invention enables the construction of impression cylinders having different external diameters—with equal internal diameters so as to facilitate their use in a printing machine—which, at the same length, have essentially the same mass.

BRIEF DESCRIPTION OF THE DRAWINGS

The present invention is described below in more detail, in light of the drawings.

FIG. 1 illustrates a longitudinal section through an impression cylinder, in accordance with one embodiment of the present invention; and FIGS. 2(a) to 2(c) illustrate various example bore patterns in impression cylinders, according to several embodiments of the present invention.

DETAILED DESCRIPTION

FIG. 1 illustrates a longitudinal section through an impression cylinder 1, according to one embodiment of the present invention. In this embodiment, the impression cylinder 1 is made of aluminum. In addition, the impression cylinder 1 has a standardized or predetermined inside diameter D, and an outside diameter d which is variable depending on the format length that is to be printed.

For example, in the case of a cylinder length of 350 mm and an inside diameter D of 78 mm, the outside diameter may include ranges of, for example, 92-100, 100-120, 120-140, 140-160, 160-180 and 180-200 mm.

By virtue of longitudinal openings 2 in the impression cylinders, the weight, or mass, of an impression cylinder may be substantially similar to the weight or mass of other impression cylinders that have a substantially similar inside diameter but a different outside diameter. More specifically, the weight or mass per unit of length of the impression cylinder is maintained constant for various different impression cylinders—and in particular for impression cylinders having substantially similar inside diameters but a different outside diameter different—by virtue of the impression cylinders having longitudinal openings distributed therethrough. The longitudinal openings are advantageously straight-through longitudinal openings, e.g., longitudinal bores 2, that are evenly or regularly, e.g., symmetrically, distributed over the circumference of the impression cylinder. The required rigidity of the impression cylinder is not functionally impaired by the longitudinal openings.

Advantageously, the longitudinal openings 2 may be provided, as shown in FIGS. 2(a) to 2(c), at one or more diameters, and advantageously prevent the impression cylinder from being imbalanced. In one embodiment, this is achieved by providing longitudinal openings that are equally and oppositely angularly spaced around the circumference of the impression cylinder, and by providing a constant cross section.

In order to provide a uniform weight or mass for different impression cylinders having the same inside diameter of the cylinder but different outside diameters, the impression cylinders may have any number of longitudinal openings. Furthermore, the longitudinal openings may have any cross-sectional shapes, e.g., circular, and may be positioned at one or any number of different diametric locations.

In this manner, the weight of the impression cylinder may be kept low, so as to make the impression cylinder easier to handle. Furthermore, the mass of various different impression cylinders may be substantially similar, so as to hold the boundary conditions for the drive controller as constant as possible.

The invention claimed is:

1. A set of impression cylinders comprising:
a first impression cylinder having an inside diameter and an outside diameter, and having a cylinder wall defining a plurality of longitudinal openings; and
a second impression cylinder having an inside diameter that is substantially similar to the inside diameter of the first impression cylinder and having an outside diameter that is different from the outside diameter of the first impression cylinder, and having a cylinder wall defining a plurality of longitudinal openings, wherein the respective longitudinal openings of the first and second impression cylinders are sized and positioned such that the first and second impression cylinders have a substantially similar mass per longitudinal unit of length.

2. The set of impression cylinders according to claim 1 wherein, in at least one of the first and second impression cylinders:
the cylinder wall has a substantially constant wall thickness over an entire length thereof, and the openings are located on at least one predefined diameter, wherein the plurality of longitudinal openings each have a constant cross section over an entire length thereof and the longitudinal openings are distributed in the cylinder wall such that the impression cylinder is substantially free from imbalance.

3. The set of impression cylinders according to claim 2, wherein in at least one of the first and second impression cylinders; the hollow cylinder is made of metal.

4. The set of impression cylinders according to claim 3, wherein in at least one of the first and second impression cylinders: the hollow cylinder is made of aluminum.

5. The set of impression cylinders according to claim 2, wherein in at least one of the first and second impression cylinders: the plurality of longitudinal openings extend the entire length of the cylinder.

6. The set of impression cylinders according to claim 2, wherein in at least one of the first and second impression cylinders: the plurality of longitudinal openings are provided on various diameters and the longitudinal openings are arranged symmetrically to a central axis of the cylinder in diameter planes having the same angular spacing with respect to one another.

7. The set of impression cylinders according to claim 6, wherein in at least one of the first and second impression cylinders: each of the plurality of the longitudinal openings that are arranged at a given diameter have a similar cross-section.

8. The set of impression cylinders according to claim 2, wherein in at least one of the first and second impression cylinders: the longitudinal openings are bores having a circular cross section.

* * * * *